(12) United States Patent
Tsunekawa et al.

(10) Patent No.: US 12,493,352 B2
(45) Date of Patent: Dec. 9, 2025

(54) PEN INCLUDING HAPTIC ELEMENT, OFFSET TRANSMITTING SECTION, AND SEESAW SWITCH

(71) Applicant: Wacom Co., Ltd., Saitama (JP)

(72) Inventors: Toru Tsunekawa, Saitama (JP); Noboru Yamaguchi, Saitama (JP)

(73) Assignee: Wacom Co., Ltd., Saitama (JP)

( * ) Notice: Subject to any disclaimer, the term of this patent is extended or adjusted under 35 U.S.C. 154(b) by 0 days.

(21) Appl. No.: 18/807,413

(22) Filed: Aug. 16, 2024

(65) Prior Publication Data

US 2024/0402818 A1 Dec. 5, 2024

Related U.S. Application Data

(63) Continuation of application No. PCT/JP2023/003003, filed on Jan. 31, 2023.

(30) Foreign Application Priority Data

Feb. 25, 2022 (JP) ................................. 2022-027825

(51) Int. Cl.
*G06F 3/01* (2006.01)
*G06F 3/0354* (2013.01)
*G06F 3/038* (2013.01)

(52) U.S. Cl.
CPC .......... *G06F 3/016* (2013.01); *G06F 3/03545* (2013.01); *G06F 3/0383* (2013.01)

(58) Field of Classification Search
CPC .... G06F 3/016; G06F 3/03545; G06F 3/0383; G06F 3/0354; G06F 3/01; G06F 3/03; G06F 3/041
See application file for complete search history.

(56) References Cited

U.S. PATENT DOCUMENTS 10,691,209 B2 * 6/2020 Huizar ................ G06F 3/03545
2013/0307829 A1 * 11/2013 Libin ....................... G06F 3/016
345/179

(Continued)

FOREIGN PATENT DOCUMENTS

JP 2014-222492 A 11/2014
JP 2019-67275 A 4/2019

OTHER PUBLICATIONS

English Translation of the International Search Report for International Application No. PCT/JP2023/003003, mailed Apr. 18, 2023. (2 pages).

*Primary Examiner* — David D Davis
(74) *Attorney, Agent, or Firm* — Seed Intellectual Property Law Group LLP

(57) ABSTRACT

Disclosed herein is a pen including a structure including a housing, a processing circuit that receives a vibration control signal, a signal transmitting circuit that, in operation, transmits a pen signal in accordance with an instruction from the processing circuit, a haptic element that, in operation, is controlled based on an instruction from the processing circuit according to the vibration control signal and that has one end fixed to the structure, and an offset transmitting section disposed inside the housing. The offset transmitting section, in operation, transmits a vibration of the haptic element to a position offset from a position where the haptic element is fixed in the structure.

12 Claims, 14 Drawing Sheets

(56) References Cited

U.S. PATENT DOCUMENTS

2014/0340326 A1* 11/2014 Kameyama ......... G06F 3/03545
                                                                  345/173
2019/0101994 A1* 4/2019 Kira .................... G06F 3/0383
2022/0326789 A1* 10/2022 Marwah ................ H02J 50/10

\* cited by examiner

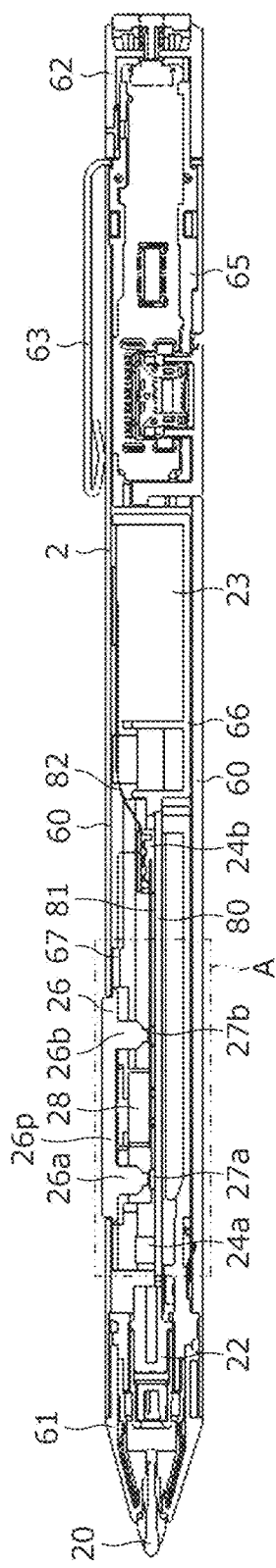
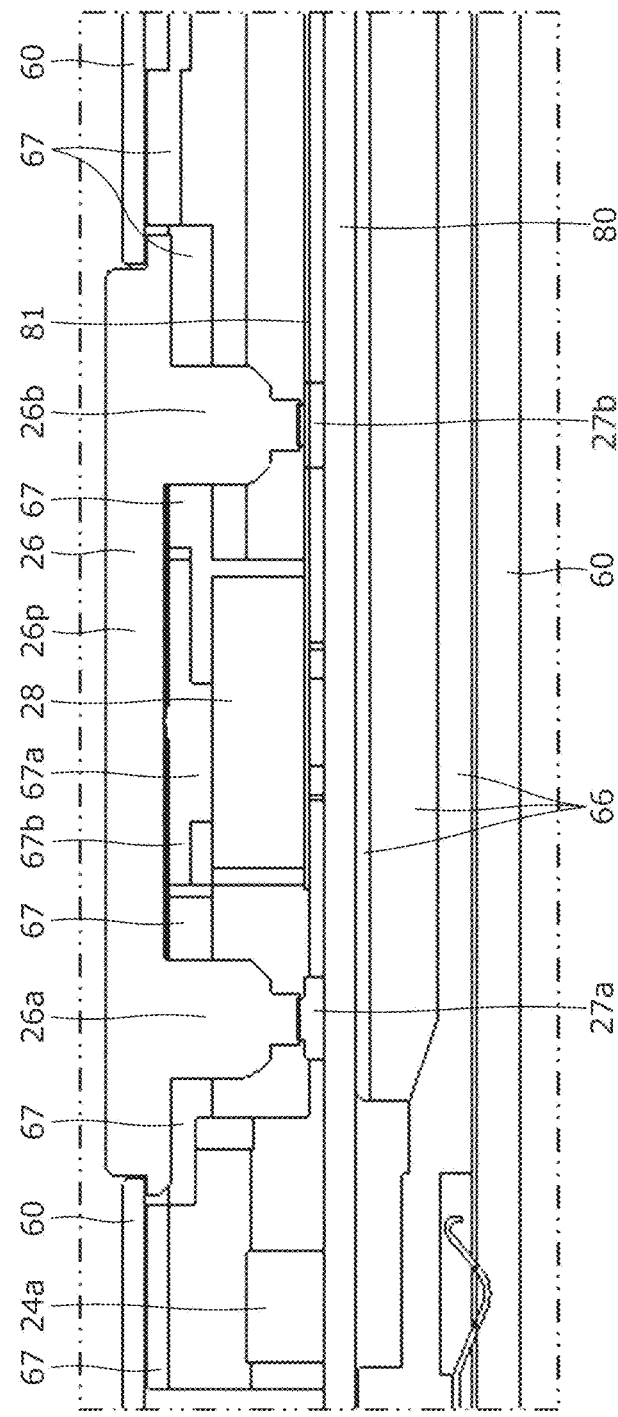
FIG. 5A
FIG. 5B

PEN INCLUDING HAPTIC ELEMENT, OFFSET TRANSMITTING SECTION, AND SEESAW SWITCH

BACKGROUND

Technical Field

The present disclosure relates to a pen including a haptic element.

Description of the Related Art

Pens that have a function to generate tactile feedback by using haptic elements are known. As an example of this type of pen, Japanese Patent Laid-open No. 2014-222492 (hereinafter referred to as Patent Document 1) describes an example in which an external oscillator is placed on the surface of the pen at a position where the index finger and the thumb touch the surface. Further, Patent Document 1 also describes an example in which a rotating oscillator is provided at an end of the pen and, by shaking the entire pen with the rotating oscillator, a vibration is applied to the position where the index finger touches the pen.

In order to effectively provide tactile feedback to a user holding a pen, as described in Patent Document 1, tactile feedback is preferably generated at the position on the surface of the pen where the index finger and the thumb touch the pen (hereinafter collectively referred to as a "finger position"). However, since a pressure sensor for detecting writing pressure, a transmitter for transmitting pen signals, and the like are densely packed at the tip of the pen, when a vibration is attempted to be applied to the finger position, conventionally, like the pen described in Patent Document 1, the only method is to attach a vibrating unit externally or to install a vibrating unit at the end of the pen to shake the entire pen. However, attaching the vibrating unit externally is ungainly and also prone to failure. Furthermore, if the entire pen is shaken, areas other than the finger position will also be vibrated, which not only will not produce the desired effect but also will increase power consumption.

BRIEF SUMMARY

Therefore, one of the objects of the present disclosure is to provide a pen that can give tactile feedback to the finger position without shaking the entire pen, by use of a built-in haptic element at a position apart from the finger position.

A pen according to a first aspect of the present disclosure is a pen including a structure including a housing, a processing circuit that, in operation, receives a vibration control signal, a signal transmitting section that, in operation, transmits a pen signal in accordance with an instruction from the processing circuit, a haptic element that, in operation, is controlled based on an instruction from the processing circuit according to the vibration control signal and that has one end fixed to the structure, and an offset transmitting section disposed inside the housing. The offset transmitting section, in operation, transmits a vibration of the haptic element to a position offset from a position where the haptic element is fixed in the structure.

A pen according to a second aspect of the present disclosure is a pen including a structure including a housing, a processing circuit that, in operation, receives a vibration control signal, a signal transmitting circuit that, in operation, transmits a pen signal in accordance with an instruction from the processing circuit, a first haptic element having one end fixed to the structure, a second haptic element provided on a rear end side of the pen as seen from the first haptic element, and an offset transmitting section disposed inside the housing. The first haptic element and the second haptic element, in operation, are each controlled based on an instruction from the processing circuit according to the vibration control signal, and the offset transmitting section, in operation, transmits a vibration of the first haptic element to a position offset from a position where the first haptic element is fixed in the structure.

According to the present disclosure, since the vibration of the haptic element can be transmitted by the offset transmitting section disposed inside the housing, the built-in haptic element at a position away from the finger position allows the tactile feedback to be given to the finger position without shaking the entire pen.

BRIEF DESCRIPTION OF THE SEVERAL VIEWS OF THE DRAWINGS

FIG. 5A is a cross-sectional view of the pen according to the first embodiment of the present disclosure, and FIG. 5B is an enlarged view of an area A illustrated in FIG. 5A;

DETAILED DESCRIPTION

Hereinafter, preferred embodiments of the present disclosure will be described in detail with reference to the accompanying drawings.

Figure 1:
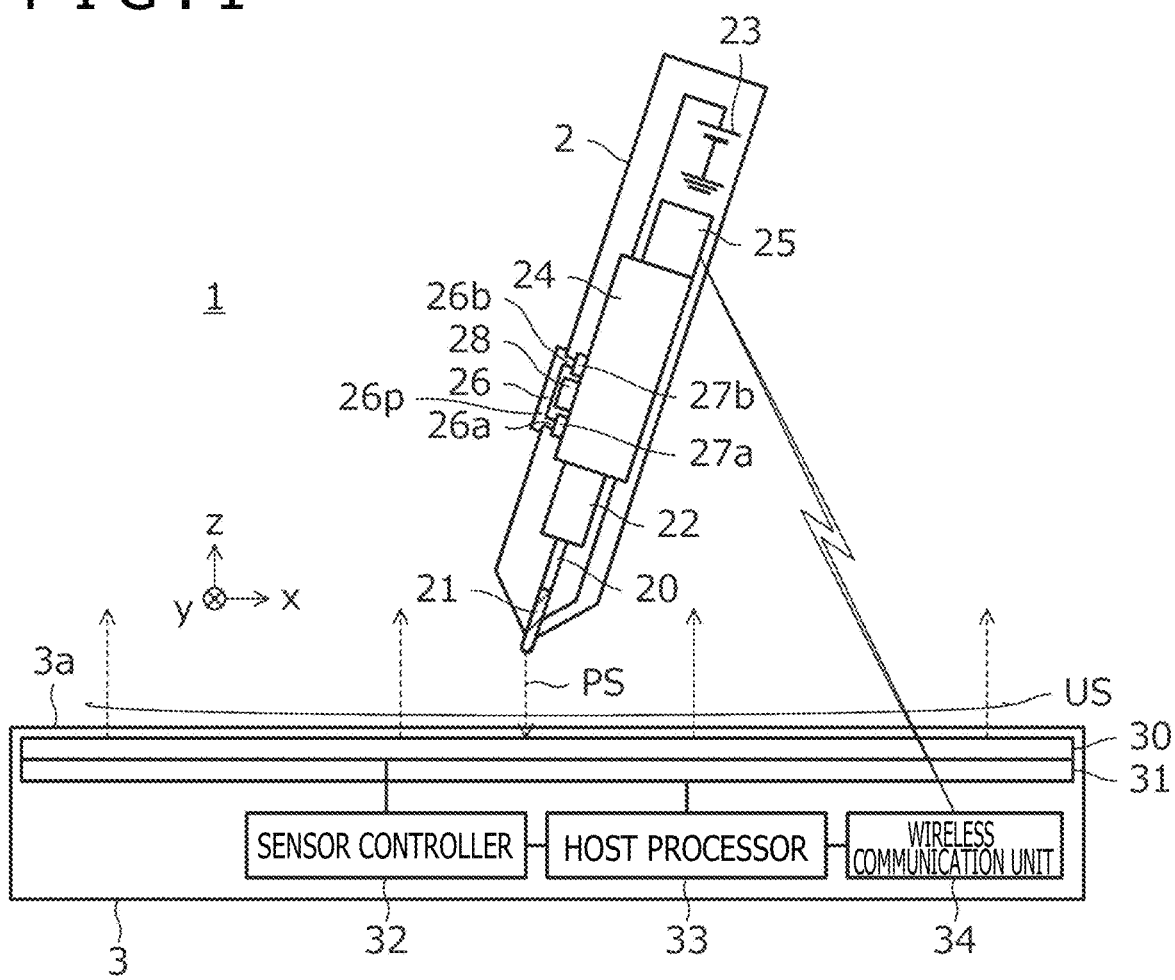
FIG. 1 is a diagram illustrating a configuration of a position detecting system including a pen according to a first embodiment of the present disclosure.

FIG. 1 is a diagram illustrating a configuration of a position detecting system 1 including a pen 2 according to a first embodiment of the present disclosure. As illustrated in the figure, the position detecting system 1 includes a pen position detecting device 3 in addition to the pen 2.

The pen position detecting device 3 is a computer having a function of detecting the pen 2, and as illustrated in FIG. 1, includes a panel surface 3a, a sensor 30 and a display 31 stacked just below the panel surface 3a, a sensor controller 32, a host processor 33, and a wireless communication unit 34. As a typical example, the pen position detecting device 3 is a personal computer such as a tablet terminal or a laptop.

The display 31 is a display device having a display surface, such as a liquid crystal display or an organic EL display. In the pen position detecting device 3, the panel surface 3a constitutes the display surface of the display 31. Further, the host processor 33 is a central processing unit of the pen position detecting device 3 that has a function of controlling each part of the pen position detecting device 3 including the display 31. The host processor 33 is configured to be able to execute the operating system of the pen position detecting device 3 and various applications including a drawing application by executing programs stored in a built-in memory. The display 31 plays a role of displaying various screens (images or videos) on the display surface on the basis of video signals generated by the operating system or the application.

The wireless communication unit 34 is a device for communicating with other devices including the pen 2 by near-field communication such as Bluetooth (registered trademark). The host processor 33 is configured to be able to communicate with the pen 2 via the wireless communication unit 34 by near-field communication.

The sensor 30 is a device used by the sensor controller 32 to communicate with the pen 2, and includes a plurality of X electrodes each extending in the y direction in the panel surface 3a and arranged in parallel at equal intervals in the x direction, and a plurality of Y electrodes each extending in the x direction in the panel surface 3a and arranged in parallel at equal intervals in the y direction. The plurality of X electrodes and the plurality of Y electrodes are each independently connected to the sensor controller 32. The plurality of X electrodes or the plurality of Y electrodes may also be shared with common electrodes in the display 31, and the pen position detecting device 3 in that case is called an "in-cell type." On the other hand, neither the plurality of X electrodes nor the plurality of Y electrodes has to be shared with common electrodes in the display 31, and the pen position detecting device 3 in that case is called an "on-cell type" or an "out-cell type."

The sensor controller 32 is an integrated circuit that has a function of deriving the position of the pen 2 in the panel surface 3a and simultaneously acquiring data from the pen 2 by communicating with the pen 2 via the sensor 30, and also has a function of sequentially supplying reports including the derived position and the acquired data to the host processor 33. The sensor controller 32 is configured to perform these functions by executing a program implemented as hardware or a program stored in a built-in memory, and to be able to execute various processes described below.

It is preferable for the communication between the sensor controller 32 and the pen 2 via the sensor 30 to be performed by an active capacitance method, for example. Although the following description assumes an active capacitance method to be used, it is obviously possible to use an electromagnetic induction method or other methods. Hereinafter, the signal sent by the sensor controller 32 to the pen 2 via the sensor 30 will be referred to as an "uplink signal US," and the signal sent by the pen 2 to the sensor controller 32 via the sensor 30 will be referred to as a "pen signal PS."

The sensor controller 32 is configured to communicate with the pen 2 in units of frames of a predetermined length of time, and transmits the uplink signal US by using a plurality of X electrodes or a plurality of Y electrodes at the beginning of each frame. The uplink signal US thus transmitted has a role of informing the pen 2 about a temporal position of the frame and a timing (time slot) in which the pen 2 should transmit the pen signal PS therein. Further, the uplink signal US includes a command indicating an instruction from the sensor controller 32 to the pen 2.

The pen signal PS may include a position signal for causing the sensor controller 32 to detect the position of the pen 2 and a data signal modulated by data transmitted from the pen 2 to the sensor controller 32. The sensor controller 32 is configured to receive the position signal by each of the plurality of X electrodes and the plurality of Y electrodes that constitute the sensor 30, and approximate a distribution of reception intensity of the position signal in each of the x direction and the y direction by using a normal distribution curve, and then derive the position of the pen 2 in the panel surface 3a (hereinafter referred to as a "pen position") by deriving respective peak positions. In addition, the sensor controller 32 is configured to receive the data signal by using one X electrode or one Y electrode closest to the pen position derived immediately before, and demodulate the data signal, thereby obtaining data transmitted by the pen 2 (hereinafter referred to as "pen data"). In addition to the response to the command in the uplink signal US, the pen data includes a writing pressure value indicating the pressure applied to the tip of the pen 2 and switch information indicating the on/off state of push button switches 27a and 27b provided on the pen 2 (to be described later).

Figure 2:
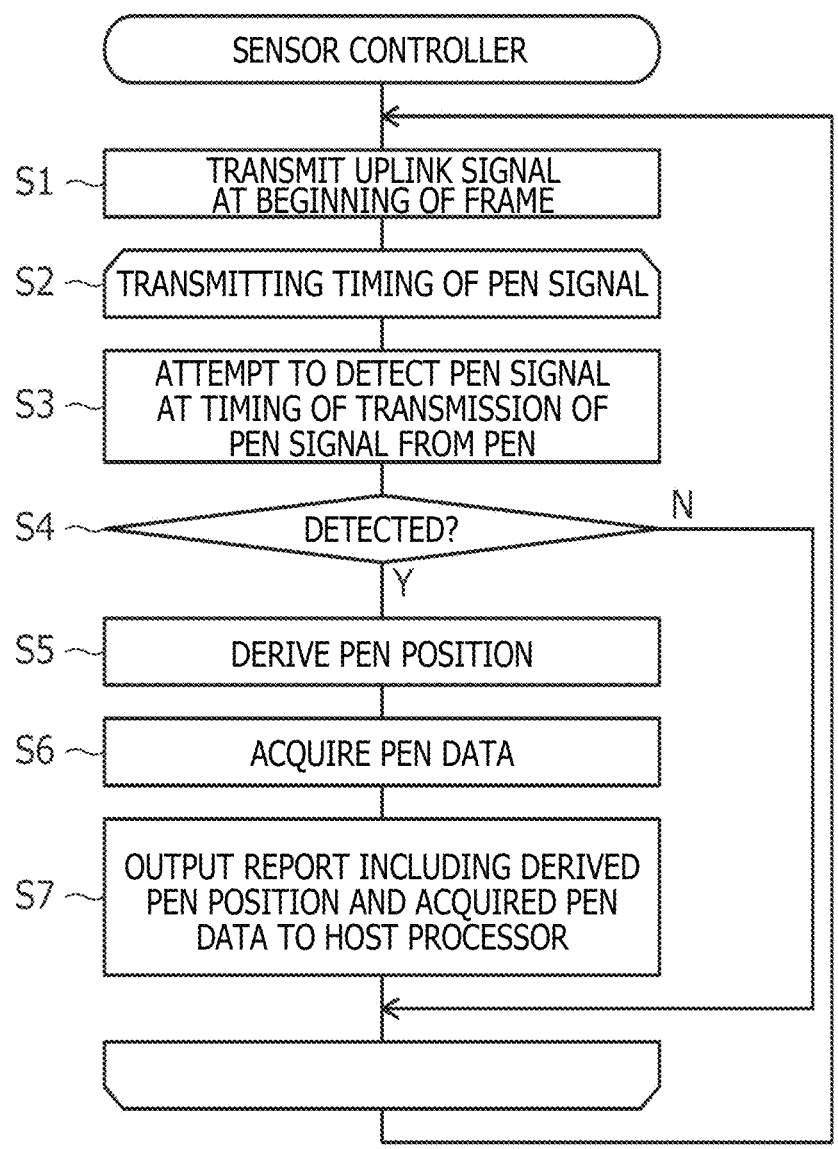
FIG. 2 is a processing flow diagram illustrating processes executed by a sensor controller according to the first embodiment of the present disclosure.

FIG. 2 is a process flow diagram illustrating the processes executed by the sensor controller 32. With reference to FIG. 2, the processes executed by the sensor controller 32 will be described in detail again. The sensor controller 32 first transmits the uplink signal US at the beginning of a frame (S1). Subsequently, the sensor controller 32 executes the processes of S3 to S7 each time the pen 2 transmits the pen signal PS in the corresponding frame (at each timing notified by the uplink signal US) (S2).

To be specific, the sensor controller 32 first attempts to detect the pen signal PS by using the sensor 30 (S3). As a result, it is determined whether or not the pen signal PS has been detected (S4), and if it is determined that the pen signal PS has not been detected, the processing moves to the next timing. On the other hand, the sensor controller 32 that has determined that the pen signal PS has been detected in S4 executes derivation of the pen position (S5) and acquisition of pen data (S6) on the basis of the detected pen signal PS.

Then, a report including the derived pen position and the acquired pen data is output to the host processor 33) S7), and the processing returns to S1.

Return to FIG. 1. A series of reports supplied by the sensor controller 32 to the host processor 33 are used in the host processor 33 for processing performed by a drawing application. The processing of the drawing application herein includes generation and display of digital ink, movement of a cursor, detection of various gestures such as tap and drag, control of a haptic element 28 (to be described later) built into the pen 2, and the like.

Among these, the generation and display of digital ink is briefly described. The drawing application is configured to first generate one piece of stroke data on the basis of a series of pen positions and pen data that are continuously acquired when the writing pressure value is greater than 0, and generate the digital ink by using the thus generated series of stroke data. Each time a new pen position is derived, the drawing application also uses one or more past pen positions included in the same stroke data to generate a spline curve, such as a Catmull-Rom curve, and performs rendering. At this time, the drawing application also performs processing to control the appearance of the generated spline curve on the basis of the pen data. This processing includes processing for controlling the line width or transparency on the basis of the writing pressure value. The drawing application generates a video signal on the basis of the thus rendered spline curve and supplies the signal to the display 31. As a result, the spline curve rendered by the drawing application is displayed on the display 31.

As illustrated in FIG. 1, the pen 2 includes a core body 20, a pen tip electrode 21, a pressure sensor 22, a battery 23, an integrated circuit 24, a wireless communication circuit 25, a seesaw switch 26, the push button switches 27a and 27b, and the haptic element 28.

The core body 20 is a columnar member that forms a pen axis of the pen 2. The tip of the core body 20 constitutes the tip of the pen 2, and the tail end is in contact with the pressure sensor 22. The pen tip electrode 21 is a conductor placed at the pen tip of the pen 2 and is electrically connected to the integrated circuit 24.

The pressure sensor 22 is a sensor that detects the pressure applied to the tip of the core body 20. The pressure detected by the pressure sensor 22 is supplied to the integrated circuit 24, and set in the pen signal PS by the integrated circuit 24 as the above-mentioned writing pressure value. The battery 23 serves to supply power necessary for the integrated circuit 24, the wireless communication circuit 25, and the haptic element 28 to operate.

The integrated circuit 24 is an integrated circuit having various circuits including a booster circuit, a transmitting circuit, a receiving circuit, and a processing circuit. The receiving circuit is connected to the pen tip electrode 21, and serves as a receiving section that receives the uplink signal US, by performing a detection operation of the uplink signal US by using the pen tip electrode 21. The transmitting circuit is also connected to the pen tip electrode 21, and serves as a signal transmitting section that sends out the pen signal PS, by applying changes to the pen tip electrode 21 by using the booster circuit at the timing indicated by the uplink signal US. The processing circuit is a circuit that functions as a control unit that controls each part of the pen 2, and generates the pen signal PS on the basis of the uplink signal US received by the receiving circuit and performs processing of causing the transmitting circuit to transmit the generated pen signal PS. For example, the processing circuit includes a processor and a memory storing instructions that, when executed by the processor, cause the processing circuit to perform the functions of the control unit described herein.

The wireless communication circuit 25 is a device for communicating with other devices including the pen position detecting device 3 by using near-field communication such as Bluetooth (registered trademark). Since near-field communication is bidirectional communication, the wireless communication circuit 25 functions as a transmitting section for transmitting signals and also functions as a receiving section for receiving signals. The integrated circuit 24 is configured to be able to communicate with the pen position detecting device 3 by near-field communication via this wireless communication circuit 25.

The host processor 33 is configured to send a vibration control signal to the pen 2 via this near-field communication. The vibration control signal is a signal for instruction for the operation of the haptic element 28. To be specific, the signal may be a signal for simply instructing the haptic element 28 to operate or may be a signal for instructing the haptic element 28 to operate at a predetermined timing. The integrated circuit 24 is configured to, upon receiving the vibration control signal via the wireless communication circuit 25, control the operation of the haptic element 28 according to the received vibration control signal.

The seesaw switch 26 is a switch pressing member having a plate-shaped portion 26p disposed along a surface of a housing 60 of the pen 2, and two legs 26a and 26b that protrude toward the inside of the housing 60 from the plate-shaped portion 26p. The legs 26a and 26b are provided near one end and the other end of the plate-shaped portion 26p in the pen axis direction, respectively, and their tips are in contact with the push button switches 27a and 27b. When a user presses down a surface on the one end side of the seesaw switch 26 in the pen axis direction, the leg 26a moves inward and presses down the push button switch 27a. On the other hand, when the user presses down a surface on the other end side of the seesaw switch 26 in the pen axis direction, the leg 26b moves inward and presses down the push button switch 27b. The push button switches 27a and 27b are configured such that, when one of these switches is turned on, the other is turned off, and when one of these switches is turned off, the other is turned on. The information regarding the on/off states of the push button switches 27a and 27b is supplied to the integrated circuit 24, and set in the pen signal PS by the integrated circuit 24 as the above-mentioned switch information.

The haptic element 28 is an element that operates under the control of the integrated circuit 24, and is arranged in an area between the two legs 26a and 26b of the seesaw switch 26. As a typical example, the haptic element 28 is constituted by a vibrator or an actuator. For example, the haptic element 28 is preferably configured by a piezo vibrator that has a weight and a piezoceramic built in a case, and that moves the weight by expanding and contracting the piezoceramic under control from the integrated circuit 24, thereby generating vibrations. Incidentally, the reason why the haptic element 28 is arranged in the area between the legs 26a and 26b is to vibrate particularly the part of the surface of the pen 2 that comes into contact with the finger of the person holding the pen 2 (or a part close to the part). However, the haptic element can also be arranged at a position other than between the legs 26a and 26b, and in a second embodiment, an example of such an arrangement will be described.

Figure 3:
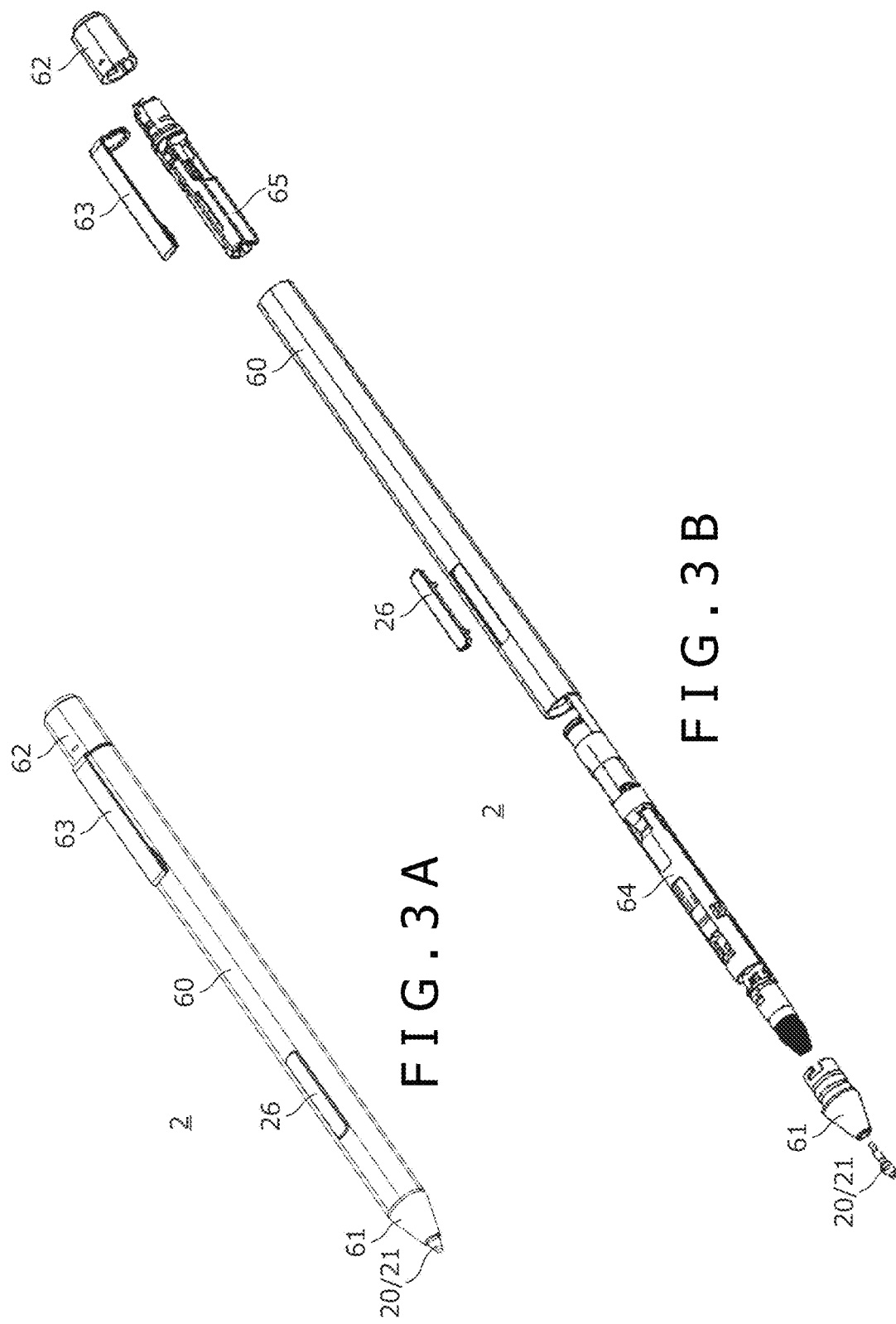
FIG. 3A is a perspective view of the pen according to the first embodiment of the present disclosure.
FIG. 3B is an exploded perspective view of the pen according to the first embodiment of the present disclosure.

FIG. 3A is a perspective view of the pen 2, and FIG. 3B is an exploded perspective view of the pen 2. First, with reference to FIG. 3A, the pen 2 further includes the housing 60, a front cap 61, a battery cap 62, and a clip 63. Among these, the front cap 61 and the battery cap 62 are fixed to the end on the pen tip side and the end on the pen rear end side of the housing 60, respectively, by screws, snap fits, or the like. Further, an opening for allowing the core body 20 to pass therethrough is provided at the tip of the front cap 61, and an opening for allowing the seesaw switch 26 to pass therethrough is provided on the surface of the housing 60. The clip 63 is fixed between the housing 60 and the battery cap 62.

Next, with reference to FIG. 3B, inside the housing 60, an internal module 64 and a battery subassembly 65 are arranged in order from the pen tip side. Among these, the internal module 64 is a member including the pressure sensor 22, the battery 23, the integrated circuit 24, the wireless communication circuit 25, the push button switches 27a and 27b, and the haptic element 28 illustrated in FIG. 1. The core body 20 and the pen tip electrode 21 are attached to the tip of the internal module 64 through the opening provided at the tip of the front cap 61. The seesaw switch 26 is attached to a side surface of the internal module 64 through the opening provided on the side surface of the housing 60. The battery subassembly 65 is a member that includes a substrate on which a charging circuit for charging the battery 23 is formed.

Figure 4:
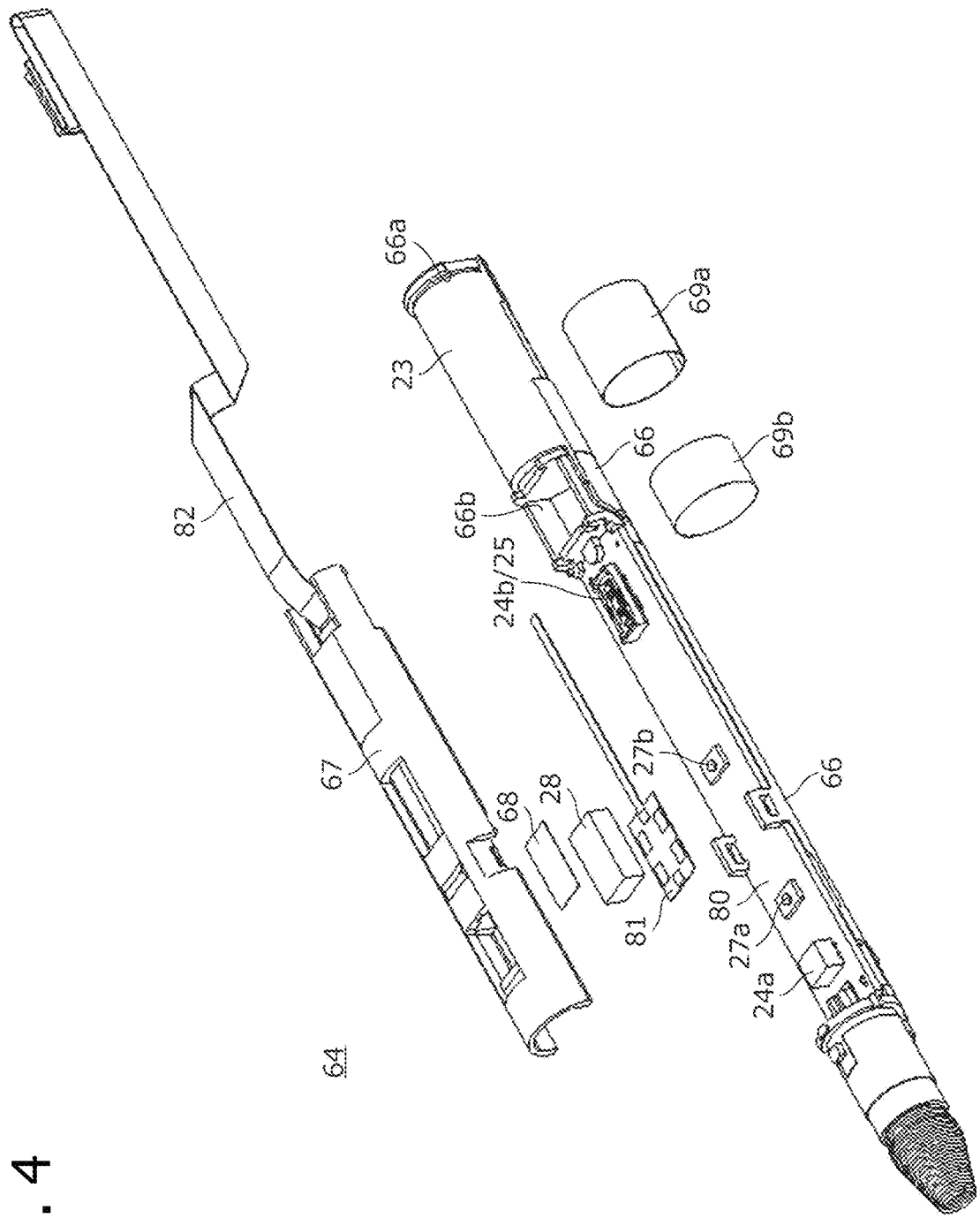
FIG. 4 is an exploded perspective view of an internal module according to the first embodiment of the present disclosure.

FIG. 4 is an exploded perspective view of the internal module 64. As illustrated in the figure, the internal module 64 further includes a substrate holder 66, a knob holder 67, a circuit board 80, and flexible printed circuit boards 81 and 82. Among these, the substrate holder 66 and the knob holder 67 are in close contact with the housing 60 and constitute the structure of the pen 2 together with the housing 60. Moreover, the circuit board 80 and the knob holder 67 are fixed to the substrate holder 66 by snap fits.

At the rear end of the substrate holder 66, two recesses 66a and 66b are provided in order from the rear side. The battery 23 is stored in the recess 66a among these. In the present embodiment, nothing in particular is stored in the recess 66b. Further, cylindrical polyimide films 69a and 69b are attached to portions of the substrate holder 66 corresponding to the recesses 66a and 66b, respectively. These polyimide films 69a and 69b serve to hold the objects stored in the recesses 66a and 66b against the substrate holder 66.

The battery 23, the integrated circuit 24, the wireless communication circuit 25, the push button switches 27a and 27b, the flexible printed circuit board 81, and the like are fixed to the circuit board 80. A circuit 24a illustrated in FIG. 4 represents the transmitting circuit in the integrated circuit 24, and a circuit 24b represents the other circuits in the integrated circuit 24. Although the circuits 24a and 24b are placed apart from each other as illustrated in FIG. 4, they constitute the integrated circuit 24 that is electrically one.

A plurality of electrodes each connected to the integrated circuit 24 are formed on an upper surface of the flexible printed circuit board 81. Further, the haptic element 28 which is a substantially rectangular parallelepiped member is arranged on the upper side of the flexible printed circuit board 81, and the plurality of electrodes formed on the upper surface of the flexible printed circuit board 81 are in contact with a plurality of electrodes arranged on a lower surface of the haptic element 28. The integrated circuit 24 is electrically connected to the haptic element 28 through this contact and is configured to serve to control the operation of the haptic element 28.

The haptic element 28 is not fixed to the flexible printed circuit board 81, but is fixed to a lower surface of the knob holder 67 with a double-faced adhesive tape 68. The vibration of the haptic element 28 caused by the control of the integrated circuit 24 is transmitted to the housing 60 via the knob holder 67, and finally transmitted to the user. The details of this transmission will be described later.

The flexible printed circuit board 82 has the role of connecting the integrated circuit 24 and the charging circuit in the battery subassembly 65. The integrated circuit 24 is configured to receive power supplied from the charging circuit via a circuit in the flexible printed circuit board 82 and supply the power to the battery 23.

Figure 6:
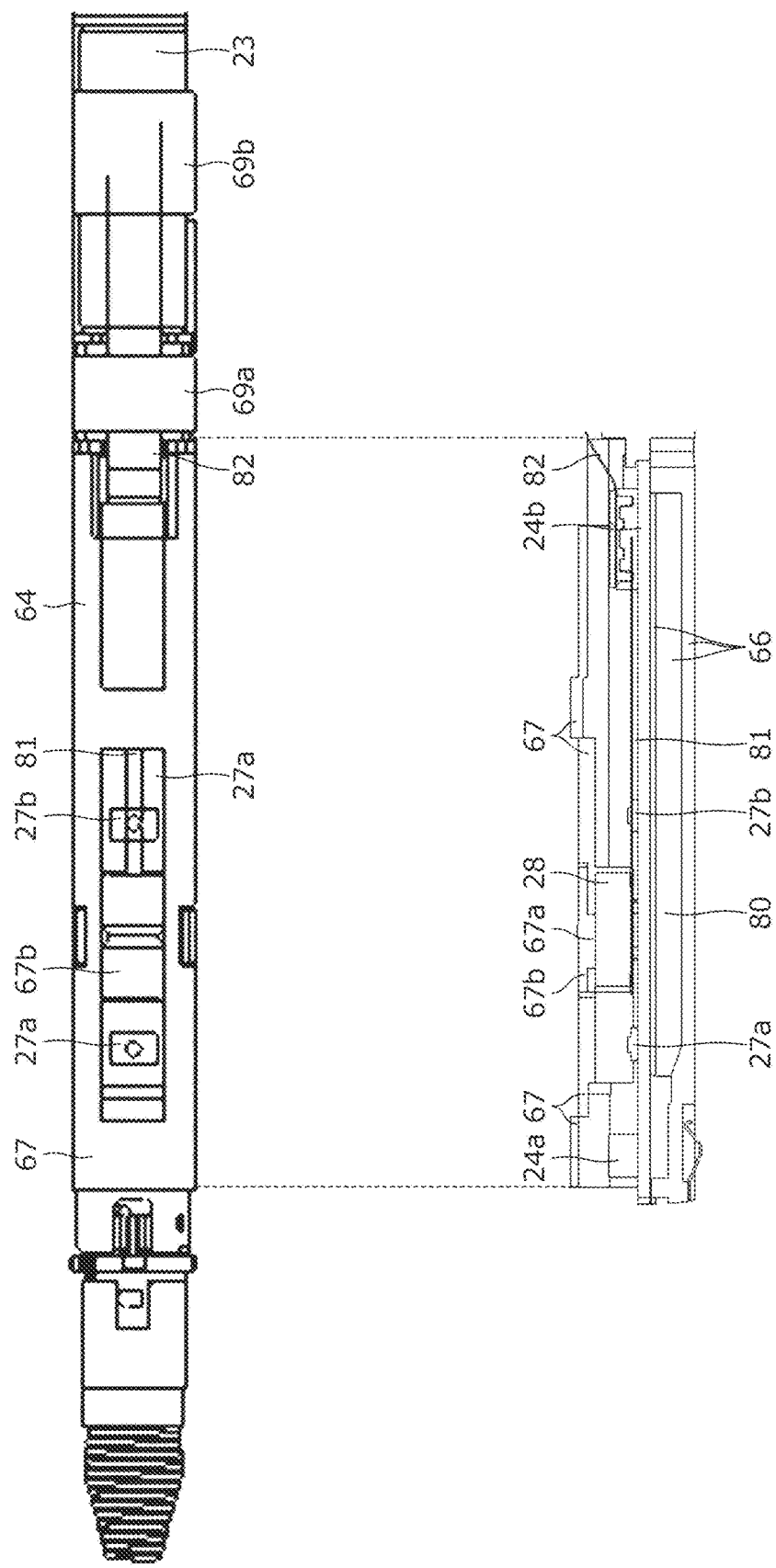
FIG. 6 is a diagram illustrating a top surface and a partial cross section of the internal module according to the first embodiment of the present disclosure.

FIG. 5A is a cross-sectional view of the pen 2, and FIG. 5B is an enlarged view of an area A illustrated in FIG. 5A. Further, FIG. 6 is a diagram illustrating a top surface and a partial cross section of the internal module 64. First, with reference to FIG. 5A, in addition to the circuit 24a, the pressure sensor 22 and the like are also arranged near the tip of the substrate holder 66. Therefore, it is difficult to secure a space for arranging the haptic element 28 near the tip of the substrate holder 66.

Next, with reference to FIG. 5B and FIG. 6, an offset transmitting section 67a and a base 67b are arranged between a upper surface of the haptic element 28 and a lower surface of the seesaw switch 26 in order from the upper surface side of the haptic element 28. Both the offset transmitting section 67a and the base 67b are part of the knob holder 67, which are integrally formed with the knob holder 67. A lower surface of the offset transmitting section 67a is fixed to the upper surface of the haptic element 28 with the double-faced adhesive tape 68 illustrated in FIG. 4. As can be understood from FIG. 5B, a part of the upper surface of the haptic element 28 is in contact with the offset transmitting section 67a via the double-faced adhesive tape 68, whereas the remaining portion of the upper surface is not in contact with the offset transmitting section 67a. As a result, vibrations on the upper surface of the haptic element 28 are concentrated on the offset transmitting section 67a. An upper surface of the base 67b is in contact with, but not fixed to, the lower surface of the seesaw switch 26. As will be described in detail later, the offset transmitting section 67a plays a role in transmitting the vibration of the haptic element 28 to a position offset from the position where the haptic element 28 is fixed (specifically, one or more finger positions) of the structure of the pen 2 including the housing 60 and the knob holder 67.

Figure 7A:
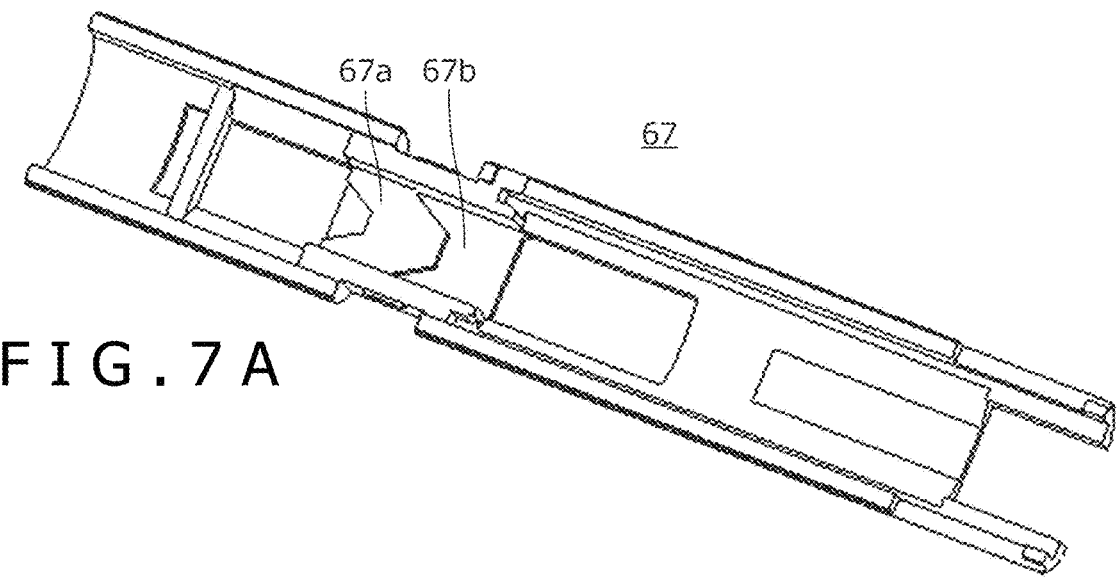
FIGS. 7A and 7B are each a perspective view of a knob holder according to the first embodiment of the present disclosure, as seen from below.
Figure 7B:
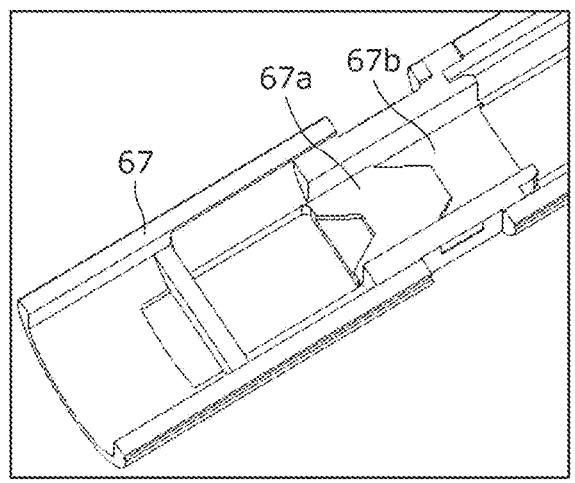
Figure 7C:
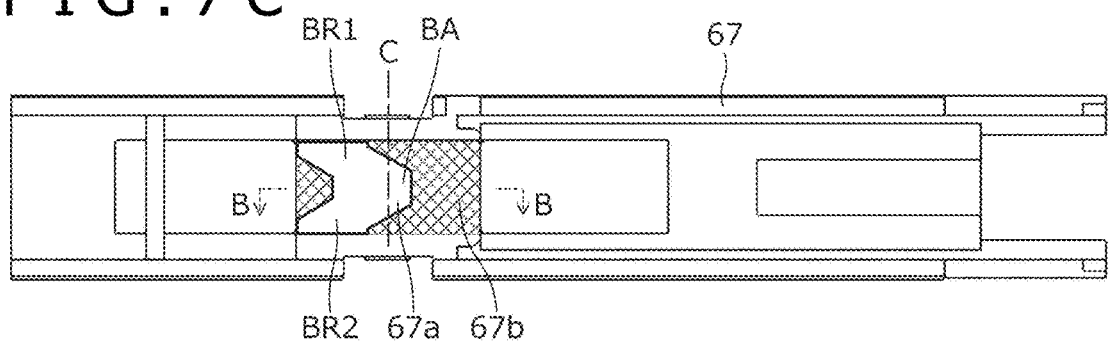
FIG. 7C is a bottom view of the knob holder according to the first embodiment of the present disclosure.

FIGS. 7A and 7B are perspective views of the knob holder 67 as seen from below. FIG. 7B illustrates only the vicinity of the offset transmitting section 67a and the base 67b. FIG. 7C is a bottom view of the knob holder 67. First, as understood with reference to FIGS. 7A and 7B, the base 67b constitutes a part of an outer wall of the knob holder 67, and the offset transmitting section 67a is a projecting portion protruding from a lower surface of the base 67b.

The offset transmitting section 67a is formed in a substantially V shape in a plan view and includes a base BA, and a first branch BR1 and a second branch BR2 connected to the base BA as illustrated in FIG. 7C. The base BA is formed to straddle a center line C of the base 67b, which is a substantially rectangular parallelepiped, in the pen axis direction. Further, the first branch BR1 is formed to protrude obliquely toward one side surface of the pen 2 while extending toward the pen tip relative to the base BA, and the second branch BR2 is formed to protrude obliquely toward the other side surface of the pen 2 while extending toward the pen tip relative to the base BA. By configuring the offset transmitting section 67a in such a shape, the vibration of the haptic element 28 is mainly transmitted to the portions of the surface of the housing 60 on both sides of the front of the seesaw switch 26. Since these positions correspond to the above-mentioned finger positions (the positions where the index finger or thumb of the user holding the pen 2 touches the pen 2), according to the pen 2 based on the present embodiment, the haptic element 28 built in at a position away from the finger position makes it possible to give tactile feedback to the finger position without shaking the entire pen 2.

Figure 8A:
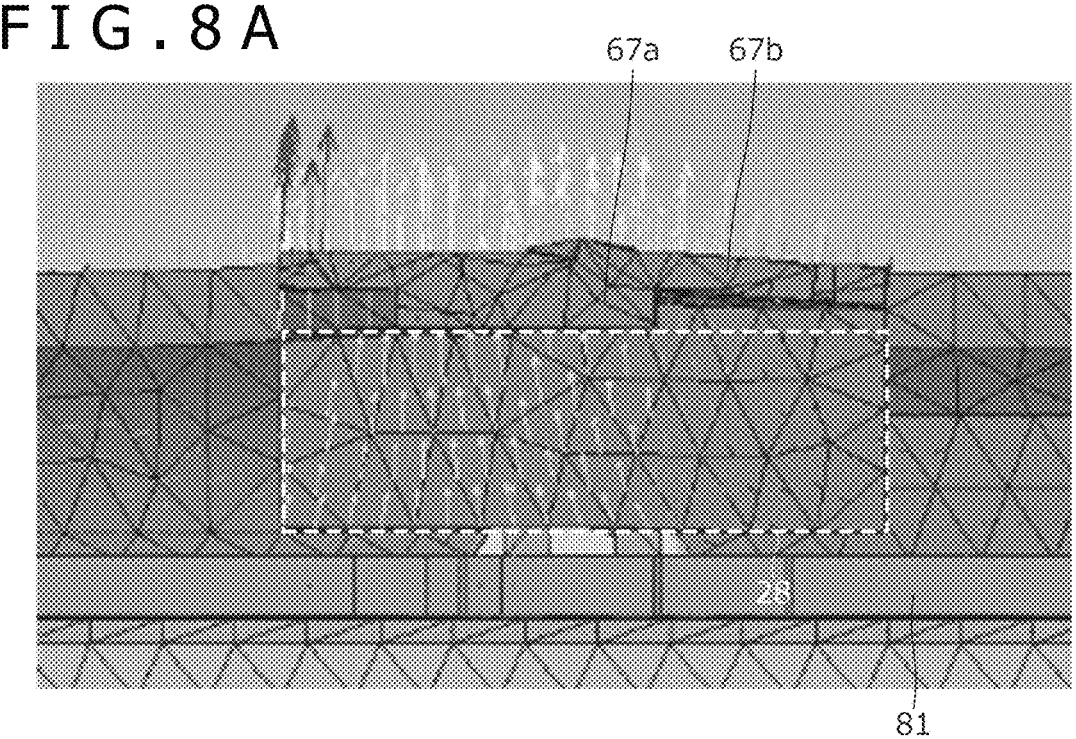
FIGS. 8A and 8B are diagrams illustrating simulation results of the vibration caused by a haptic element according to the first embodiment of the present disclosure.
Figure 8B:
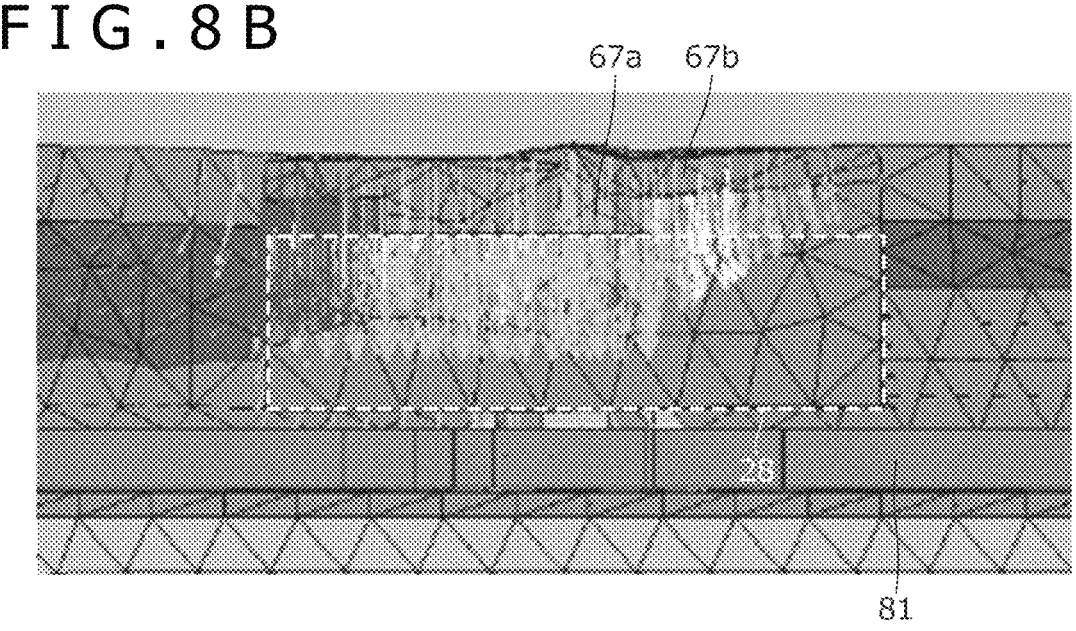

FIGS. 8A and 8B are diagrams illustrating simulation results of the vibration caused by the haptic element 28, and each illustrates a cross section of the pen 2 corresponding to the line B-B illustrated in FIG. 7C. Further, FIG. 8A illustrates a state in which the haptic element 28 is displaced upward, and FIG. 8B illustrates a state in which the haptic element 28 is displaced downward. The direction of arrows illustrated in these figures indicates the direction of displacement, and the length of the arrows indicates the magnitude of displacement.

As is clear from the simulation results illustrated in FIGS. 8A and 8B, in the pen 2 according to the present embodiment, the amount of displacement of the surface of the base 67b (the surface facing the housing 60) is larger on the tip side (left side in the drawing) of the pen 2 and smaller on the rear end side (right side in the drawing). From this result, it can be said that, by providing the offset transmitting section 67a, the vibration of the haptic element 28 can be transmitted to a position offset from the position where the haptic element 28 is fixed.

As described above, according to the pen 2 based on the present embodiment, the vibration of the haptic element 28 can be transmitted by the offset transmitting section 67a arranged inside the housing 60, so that the built-in haptic element 28 located away from the finger position makes it possible to provide tactile feedback to the finger position without shaking the entire pen 2.

Incidentally, in the present embodiment, an example has been described in which the offset transmitting section 67a has a substantially V-shaped protrusion, but the shape of the offset transmitting section 67a is not limited to the V-like shape. Hereinafter, an example of the offset transmitting section 67a that is not substantially V-shaped will be described.

Figure 9A:
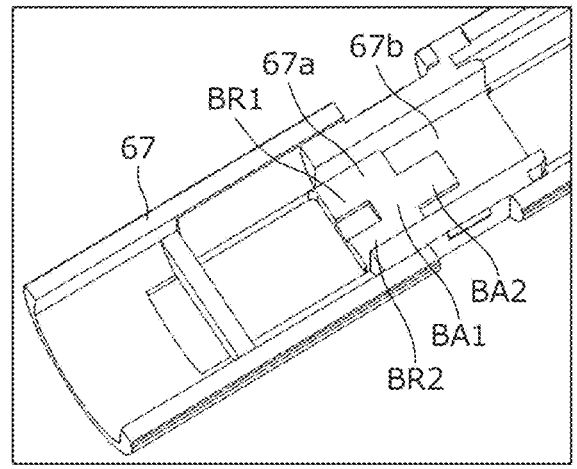
FIGS. 9A and 9B are diagrams respectively illustrating the knob holder of the pen according to first and second modification examples of the first embodiment of the present disclosure.
Figure 9B:
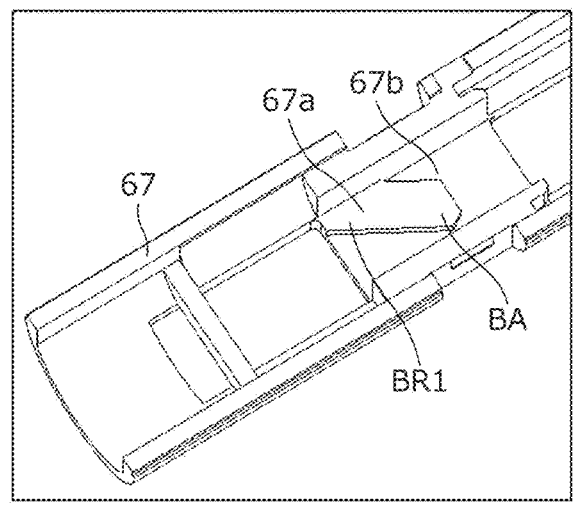

FIGS. 9A and 9B are diagrams illustrating the knob holder 67 of the pen 2 according to first and second modification examples of the present embodiment, respectively. As with FIG. 7B, these figures are perspective views of the knob holder 67 as seen from below, and each only illustrates the vicinity of the offset transmitting section 67a and the base 67b.

The offset transmitting section 67a illustrated in FIG. 9A is different from the offset transmitting section 67a according to the present embodiment in that the offset transmitting section 67a illustrated in FIG. 9A has the first branch BR1 and the second branch BR2 each extending parallel to the pen axis direction along an edge of the base 67b, and in that the offset transmitting section 67a illustrated in FIG. 9A has a first base BA1 spanning over respective ends on the pen rear end side of the first branch BR1 and the second branch BR2 and a second base BA2 that protrudes from the center of the first base BAL toward the rear end side of the pen 2 in parallel to the pen axis direction, instead of the base BA illustrated in FIG. 7C. With the offset transmitting section 67a having such a shape as well, the vibration of the haptic element 28 can be transmitted to portions of the surface of the housing 60 on both sides of the front of the seesaw switch 26, so that the tactile feedback can be given to the finger position by the haptic element 28 built in at a position away from the finger position, without shaking the entire pen 2, as in the present embodiment.

The offset transmitting section 67a illustrated in FIG. 9B differs from the offset transmitting section 67a according to the present embodiment in that the offset transmitting section 67a illustrated in FIG. 9B does not include the second branch BR2. According to the offset transmitting section 67a having such a shape, it becomes possible to transmit the vibration of the haptic element 28 to a portion of the surface of the housing 60 on one side of the front of the seesaw switch 26 (the first branch BR1 side), while the vibration of the haptic element 28 is no longer transmitted to a portion of the surface of the housing 60 on the other side of the front of the seesaw switch 26. Therefore, it becomes possible to selectively give tactile feedback to only one of the user's index finger and thumb.

Figures 10A, 10B:
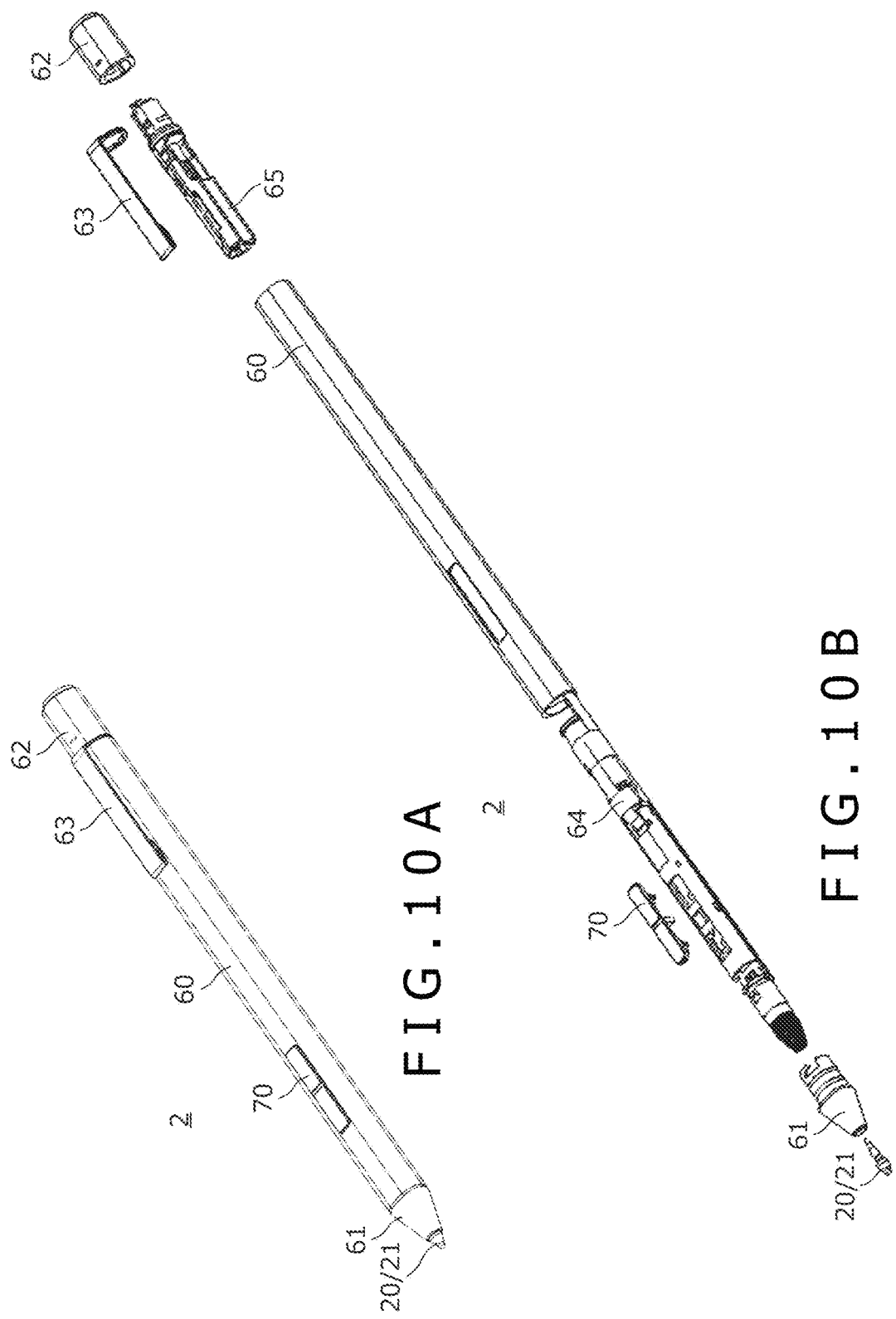
FIGS. 10A and 10B are diagrams illustrating the configuration of the position detecting system including the pen according to a second embodiment of the present disclosure.
Figure 11:
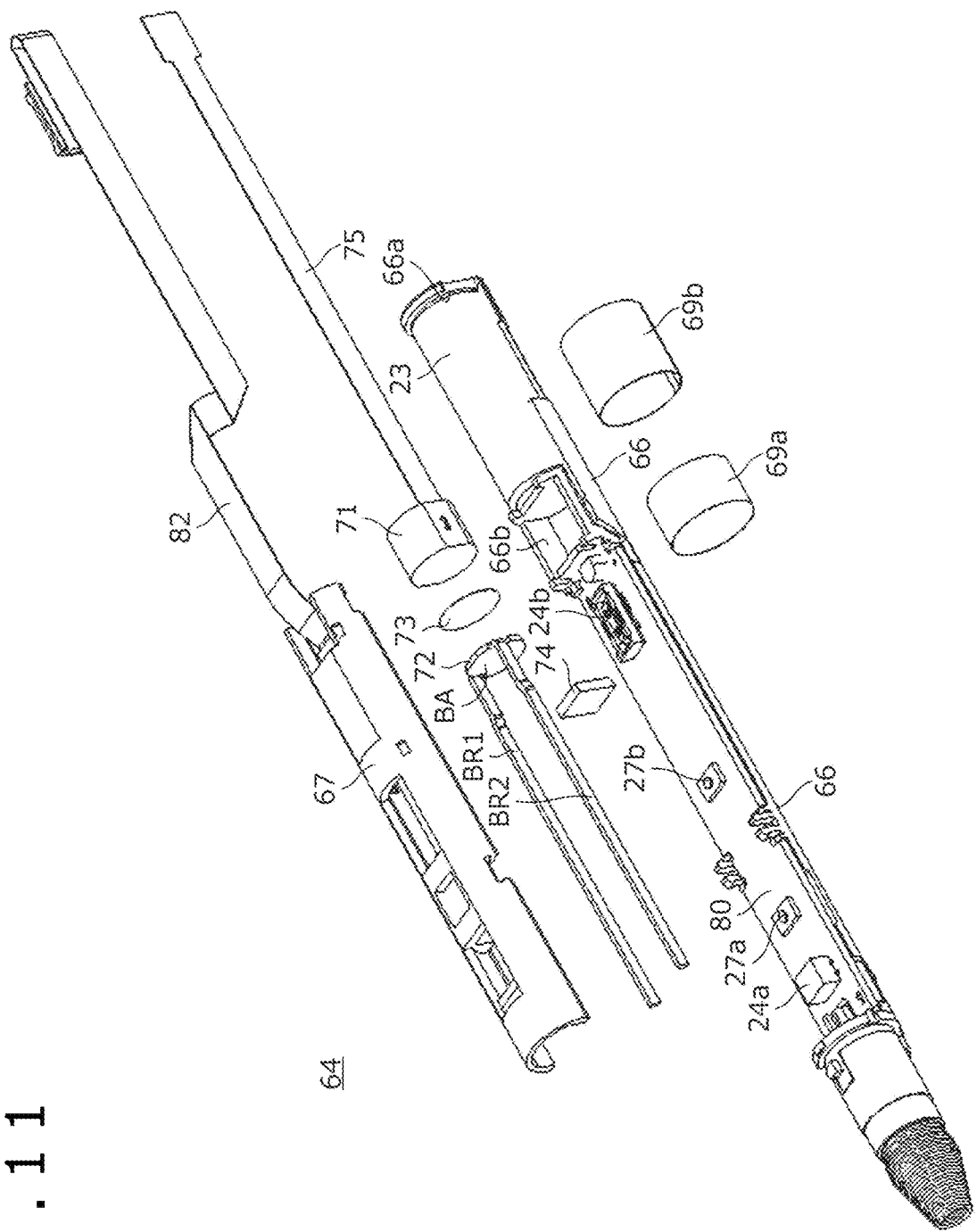
FIG. 11 is an exploded perspective view of the internal module according to the second embodiment of the present disclosure.
Figure 12A:
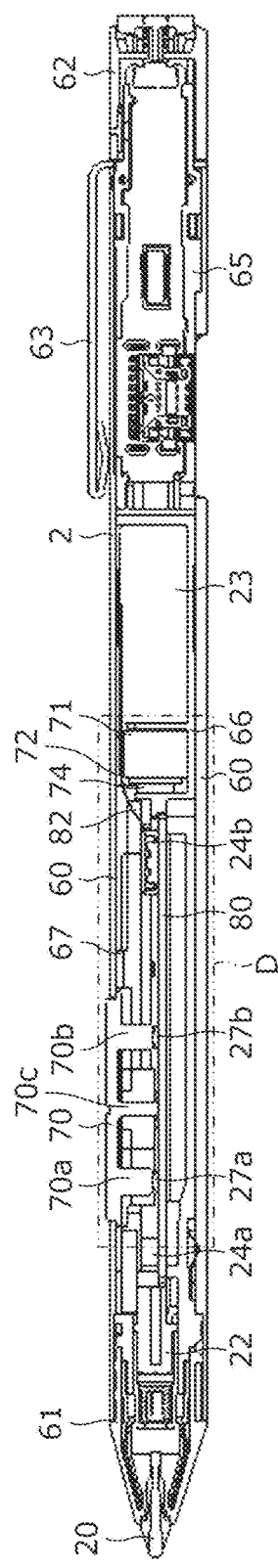
FIG. 12A is a cross-sectional view of the pen according to the second embodiment of the present disclosure.
Figure 12B:
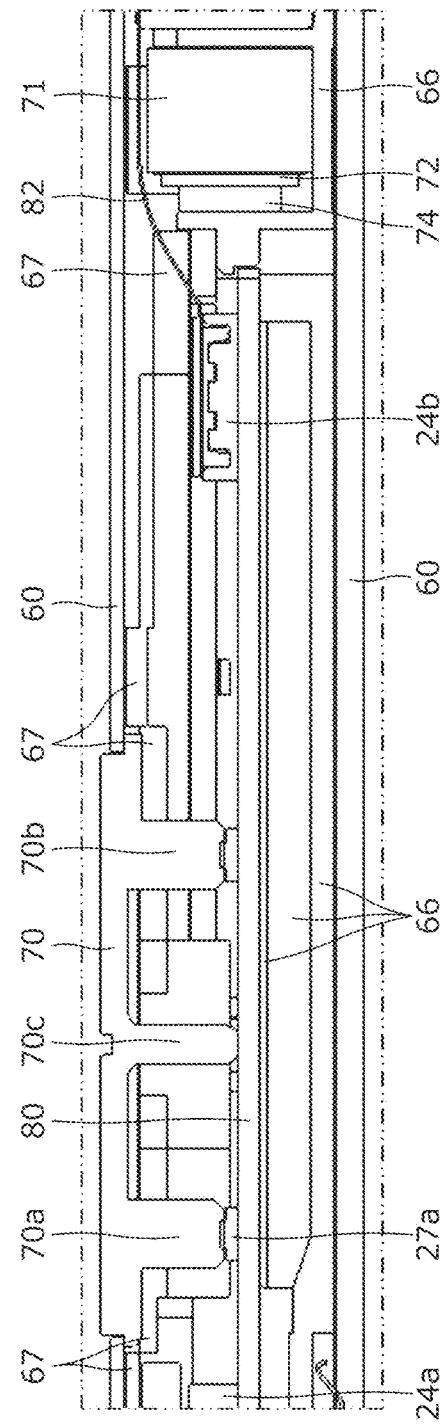
FIG. 12B is an enlarged view of an area D illustrated in FIG. 12A.

FIGS. 10A and 10B are diagrams illustrating the configuration of the position detecting system 1 including the pen 2 according to the second embodiment of the present disclosure. Further, FIG. 11 is an exploded perspective view of the internal module 64 according to the present embodiment, FIG. 12A is a cross-sectional view of the pen 2 according to the present embodiment, and FIG. 12B is an enlarged view of an area D illustrated in FIG. 12A. Hereinafter, the configuration of the pen 2 according to the second embodiment of the present disclosure will be described in detail with reference to these figures.

The pen 2 according to the present embodiment is different from the pen 2 according to the first embodiment in that the pen 2 according to the present embodiment has a seesaw switch 70 instead of the seesaw switch 26, a haptic element 71 instead of the haptic element 28, and an offset transmitting section 72 instead of the offset transmitting section 67a as illustrated in FIGS. 10A, 10B, and 11.

As illustrated in FIGS. 12A and 12B, the seesaw switch 70 is a switch pressing member having three legs 70a to 70c, each of which is provided to protrude toward the inside of the housing of the pen 2. Among these, the legs 70a and 70b are provided near one end and the other end of the seesaw switch 70 in the pen axis direction, respectively, like the legs 26a and 26b illustrated in FIGS. 5A and 5B, and the tips of the legs 70a and 70b are in contact with the push button switches 27a and 27b. Meanwhile, the leg 70c is provided at the center of the seesaw switch 70 in the pen axis direction, and its tip is in contact with a surface of the circuit board 80.

The operation in which, when the user presses down a surface on the one end side of the seesaw switch 70 in the pen axis direction, the leg 70a moves inward and presses the push button switch 27a, and the operation in which, when the user presses down a surface on the other end side of the seesaw switch 70 in the pen axis direction, the leg 70b moves inward and presses the push button switch 27b are similar to those of the seesaw switch 26. The leg 70c functions as a fulcrum of the seesaw switch 70.

Since the seesaw switch 70 has the leg 70c, in the pen 2 according to the present embodiment, a space for arranging the haptic element 28 cannot be secured directly below the seesaw switch 70. Therefore, in the present embodiment, the haptic element 71 is arranged in the recess 66b (the position closer to the rear end of the pen 2 than the circuit 24b is) described with reference to FIG. 4, as illustrated in FIG. 11. The offset transmitting section 72 plays a role of transmitting, to the finger position, the vibration of the haptic element 71 disposed in the recess 66b far away from the finger position.

As illustrated in FIG. 11, the offset transmitting section 72 includes the base BA, and the first branch BR1 and the second branch BR2 each connected to the base BA. The base BA is formed in the shape of a disk whose normal direction is the pen axis direction. A surface on the pen rear end side of the base BA is fixed to a surface on the pen tip side of the haptic element 71 with a double-faced adhesive tape 73. Further, as illustrated in FIG. 12B, a buffer material 74 is arranged between a surface on the pen tip side of the base BA and an inner surface of the recess 66b. The first branch BR1 and the second branch BR2 are each formed into a long rod shape and are each fixed to the base BA at one end thereof.

As with the haptic element 28, the haptic element 71 is an element that operates under the control of the integrated circuit 24, and is typically configured by an actuator that can cause the surface on the pen tip side to vibrate. However, the haptic element 71 may be configured by a vibrator similar to that of the haptic element 28. Since the offset transmitting section 72 is fixed to the surface on the pen tip side of the haptic element 71 with the double-faced adhesive tape 73, the offset transmitting section 72 also vibrates as the haptic element 71 vibrates.

Figure 13:
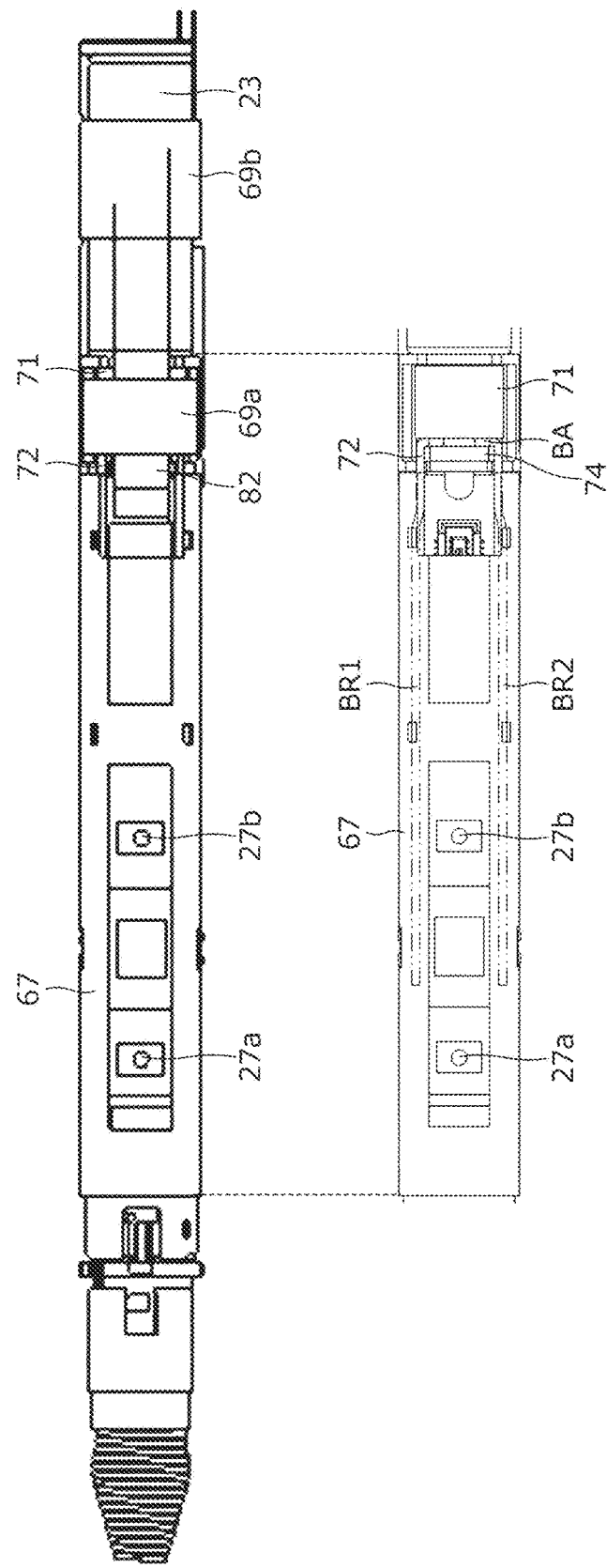
FIG. 13 depicts a diagram illustrating a top surface of the internal module and a transparent diagram illustrating a part of an internal structure according to the second embodiment of the present disclosure.
Figure 14:
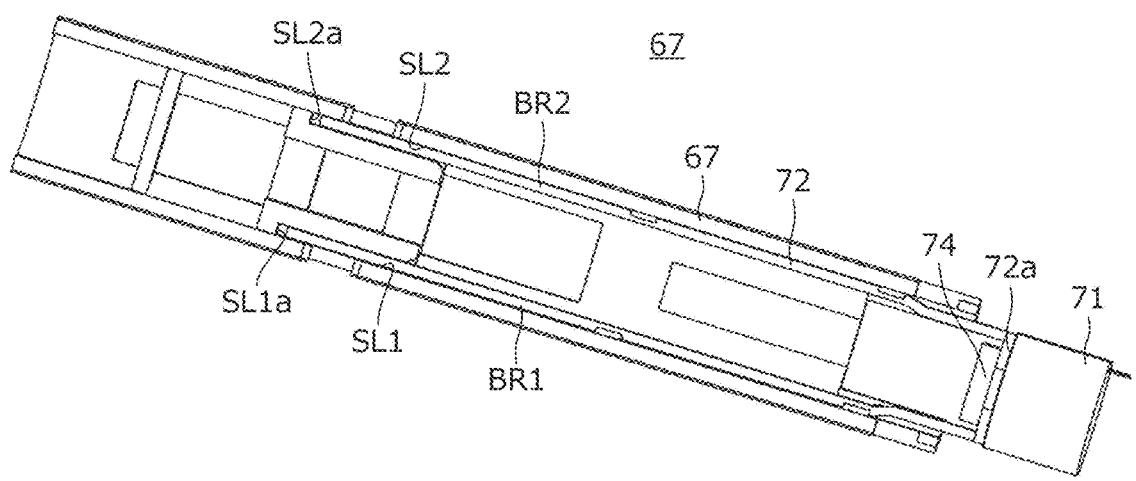
FIG. 14 is a perspective view of the knob holder according to the second embodiment of the present disclosure, as seen from below.

FIG. 13 depicts a top view of the internal module 64 and a transparent view illustrating a part of an internal structure, and FIG. 14 is a perspective view of the knob holder 67 as seen from below. FIG. 14 also illustrates the haptic element 71, the offset transmitting section 72, and the buffer material 74. Hereinafter, the configuration and operation of the offset transmitting section 72 will be described in detail with reference to these figures.

First, with reference to FIG. 13, the offset transmitting section 72 is arranged such that the first branch BR1 and the second branch BR2, each of which is a rod-shaped member, extend straight from the base BA toward the pen tip along an inner side surface of the knob holder 67 to reach a position directly below the seesaw switch 70. The vibration of the haptic element 71 is thus transmitted to the vicinity of the seesaw switch 70 via the offset transmitting section 72.

Next, with reference to FIG. 14, the knob holder 67 has slits SL1 and SL2 at positions on both inner side surfaces corresponding to the lower side of the seesaw switch 70. The other end of the first branch BR1 is inserted into the slit SL1, and the other end of the second branch BR2 is inserted into the slit SL2. The depth of each of the slits SL1 and SL2 in the pen axis direction is adjusted in advance such that the tips of the first branch BR1 and the second branch BR2 hit bottom surfaces SL1a and SL2a of the slits SL1 and SL2 (inner surfaces on the pen tip side) when the first branch BR1 and the second branch BR2 vibrate due to the vibration of the haptic element 71.

Accordingly, the offset transmitting section 72 functions as a beater that repeatedly hits the knob holder 67 according to the vibration of the haptic element 71. Then, since the positions of the bottom surfaces SL1a and SL2a correspond to the above-mentioned finger positions (the positions where the index finger or thumb of the user holding the pen 2 touches the pen 2), according to the pen 2 based on the present embodiment, the built-in haptic element 71 away from the finger positions makes it possible to provide tactile feedback to the finger positions.

Further, according to the pen 2 based on the present embodiment, the vibration of the entire pen 2 due to the vibration of the haptic element 71 is prevented. That is, if the surface on the pen tip side of the base BA is in direct contact with the inner surface of the recess 66b, the vibration of the haptic element 71 would be transmitted to the knob holder 67 and the circuit board 80 through the contact between the surface on the pen tip side of the base BA and the knob holder 67, and as a result, the entire pen 2 would vibrate. However, in the present embodiment, since the buffer material 74 is arranged between the surface on the pen tip side of the base BA and the inner surface of the recess 66b, the buffer material 74 plays the role of absorbing vibrations on the surface on the pen tip side of the base BA. Therefore, since the vibration transmitting path as described above is blocked, the pen 2 can be prevented from entirely vibrating.

As described above, also in the pen 2 according to the present embodiment, the vibration of the haptic element 71 can be transmitted by the offset transmitting section 72 arranged inside the housing 60, and the pen 2 can be prevented from entirely vibrating by the buffer material 74. Accordingly, the haptic element 71 built in at a position away from the finger position makes it possible to give tactile feedback to the finger position without shaking the entire pen 2.

While the preferred embodiments of the present disclosure have been described above, the present disclosure is not limited to these embodiments in any way, and needless to say, the present disclosure may be implemented in various forms without departing from the gist thereof.

For example, in each of the above embodiments, an example in which one haptic element is provided inside the pen 2 has been described, but a plurality of haptic elements may be provided inside the pen 2.

Figure 15:
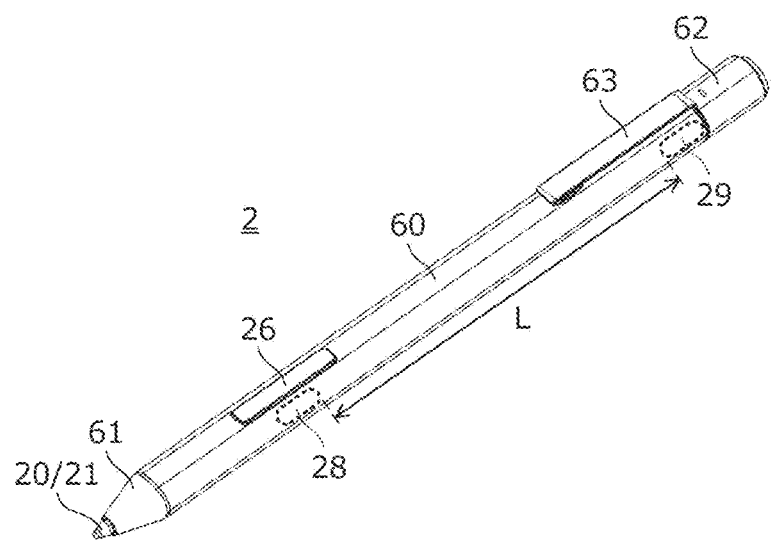
FIG. 15 is a perspective view of the pen according to a third modification example of the first embodiment of the present disclosure.

FIG. 15 is a perspective view of the pen 2 according to a third modification example of the first embodiment. The pen 2 according to this modification example includes a second haptic element 29 on the rear end side of the pen 2 as seen from the haptic element 28. In this case, the second haptic element 29 is preferably placed at a position 100 mm or more (the illustrated length L≥100 mm) away from the first haptic element 28 in the pen axis direction such that the user can easily feel the vibrations of the two haptic elements in a distinguished manner. Further, it is preferable to further provide a switch unit in the integrated circuit 24 to switch the connection destination of a circuit that controls the operation of the haptic element 28 according to the vibration control signal, between the haptic element 28 and the haptic element 29, and to configure the integrated circuit 24 such that this switch unit can be switched under control from the host processor 33 through the near-field communication. This allows the integrated circuit 24 to exclusively control the haptic elements 28 and 29, thereby preventing the user from being confused by simultaneous vibrations of the two haptic elements 28 and 29.

The various embodiments described above can be combined to provide further embodiments.

All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A pen, comprising:
a structure including a housing;
a processing circuit that, in operation, receives a vibration control signal;
a signal transmitting circuit that, in operation, transmits a pen signal in accordance with an instruction from the processing circuit;
a haptic element that, in operation, is controlled based on an instruction from the processing circuit according to the vibration control signal and that has one end fixed to the structure;
an offset transmitting section disposed inside the housing; and
a seesaw switch attached to the housing,
wherein the offset transmitting section, in operation, transmits a vibration of the haptic element to a position offset from a position where the haptic element is fixed in the structure
wherein the seesaw switch includes a plate-shaped portion disposed along a surface of the housing, and a first leg and a second leg protruding from the plate-shaped portion toward an inside of the housing,
wherein the haptic element is disposed between the first leg and the second leg,
wherein the haptic element has a flat surface that is in contact with the offset transmitting section, and
wherein a part of the flat surface of the haptic element is in contact with the offset transmitting section, and a remaining part of the flat surface is not in contact with the offset transmitting section.

2. The pen according to claim 1, wherein
the position offset from the position where the haptic element is fixed in the structure is a position where an index finger or a thumb of a user holding the pen touches the pen.

3. The pen according to claim 1, wherein
the offset transmitting section, in operation, transmits the vibration of the haptic element to a plurality of positions that are each offset from the position where the haptic element is fixed in the structure.

4. The pen according to claim 3, wherein
the positions in the structure that are each offset from the position where the haptic element is fixed are positions where an index finger and a thumb of a user holding the pen touch the pen.

5. The pen according to claim 3, wherein
the offset transmitting section includes a base, and a first branch and a second branch connected to the base.

6. The pen according to claim 1, wherein
the structure includes a knob holder through which the seesaw switch passes, and
the vibration of the haptic element is transmitted to the housing via the knob holder.

7. A pen, comprising:
a structure including a housing;
a processing circuit that, in operation, receives a vibration control signal;
a signal transmitting circuit that, in operation, transmits a pen signal in accordance with an instruction from the processing circuit;
a haptic element that, in operation, is controlled based on an instruction from the processing circuit according to the vibration control signal and that has one end fixed to the structure; and
an offset transmitting section disposed inside the housing,
wherein the offset transmitting section, in operation, transmits a vibration of the haptic element to a position offset from a position where the haptic element is fixed in the structure,
wherein the offset transmitting section, in operation, transmits the vibration of the haptic element to a plurality of positions that are each offset from the position where the haptic element is fixed in the structure,
wherein the offset transmitting section includes a base, and a first branch and a second branch connected to the base,
wherein the haptic element is located closer to a rear end of the pen than the processing circuit is, and
wherein the offset transmitting section is configured by a beater that transmits the vibration of the haptic element to a tip side of the pen.

8. The pen according to claim 7, wherein
a surface of the haptic element on the tip side of the pen, in operation, vibrates, and
the pen further includes a buffer material disposed between the base of the beater and a circuit board on which the processing circuit is mounted.

9. A pen, comprising:
a structure including a housing;
a processing circuit that, in operation, receives a vibration control signal;
a signal transmitting circuit that, in operation, transmits a pen signal in accordance with an instruction from the processing circuit;
a first haptic element having one end fixed to the structure;
a second haptic element provided on a rear end side of the pen as seen from the first haptic element;
an offset transmitting section disposed inside the housing; and
a seesaw switch attached to the housing,
wherein the first haptic element and the second haptic element, in operation, are each controlled based on an instruction from the processing circuit according to the vibration control signal,
wherein the offset transmitting section, in operation, transmits a vibration of the first haptic element to a position offset from a position where the first haptic element is fixed in the structure,
wherein the seesaw switch includes a plate-shaped portion disposed along a surface of the housing, and a first leg and a second leg protruding from the plate-shaped portion toward an inside of the housing,
wherein the first haptic element is disposed between the first leg and the second leg,
wherein the first haptic element has a flat surface that is in contact with the offset transmitting section, and
wherein a part of the flat surface of the first haptic element is in contact with the offset transmitting section, and a remaining part of the flat surface is not in contact with the offset transmitting section.

10. The pen according to claim 9, wherein
the second haptic element is disposed at a position 100 mm or more away from the first haptic element in a pen axis direction.

11. The pen according to claim 9, further comprising:
a switch circuit that, in operation, switches a connection destination of the processing circuit between the first haptic element and the second haptic element.

12. The pen according to claim 9, wherein
the first haptic element and the second haptic element are exclusively controlled by the processing circuit.

* * * * *